United States Patent [19]
Bailey

[11] 4,424,623
[45] Jan. 10, 1984

[54] APPARATUS FOR LADDER CONSTRUCTIONS

[76] Inventor: William Bailey, P.O. Box 73, Acacia Ridge 4110 Queensland, Australia

[21] Appl. No.: 392,376

[22] Filed: Jun. 25, 1982

Related U.S. Application Data

[62] Division of Ser. No. 136,767, Apr. 3, 1980.

[30] Foreign Application Priority Data

Apr. 4, 1979 [AU] Australia .................. PD8319

[51] Int. Cl.³ .................. B23P 21/00; B23Q 15/00
[52] U.S. Cl. .................. 29/716; 29/798; 29/243.52; 29/429
[58] Field of Search .................. 29/243.52, 798, 716, 29/432, 432.2, 429; 182/228

[56] References Cited

U.S. PATENT DOCUMENTS

| 2,244,073 | 6/1941 | Lyon | 29/432.1 |
| 3,119,435 | 1/1964 | Greenman | 29/243.52 |
| 3,280,454 | 10/1966 | Rich et al. | 29/243.52 |
| 3,388,454 | 6/1968 | Willis | 29/243.52 X |
| 3,579,802 | 5/1971 | Gajonski | 29/432.2 |
| 4,118,134 | 10/1978 | Mansel | 29/432 X |
| 4,204,312 | 5/1980 | Tooker | 29/523 |

Primary Examiner—Charlie T. Moon
Attorney, Agent, or Firm—Murray Schaffer

[57] ABSTRACT

This invention relates to a method of forming a step to stile joint in a ladder which does not utilize mechanical fastenings such as rivets and the like. According to this invention, the step is provided with integral hollow sections extending therealong which protrude from each end and which pass through apertures in the stiles and are adapted to be swage connected thereto.

5 Claims, 7 Drawing Figures

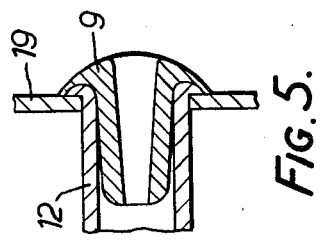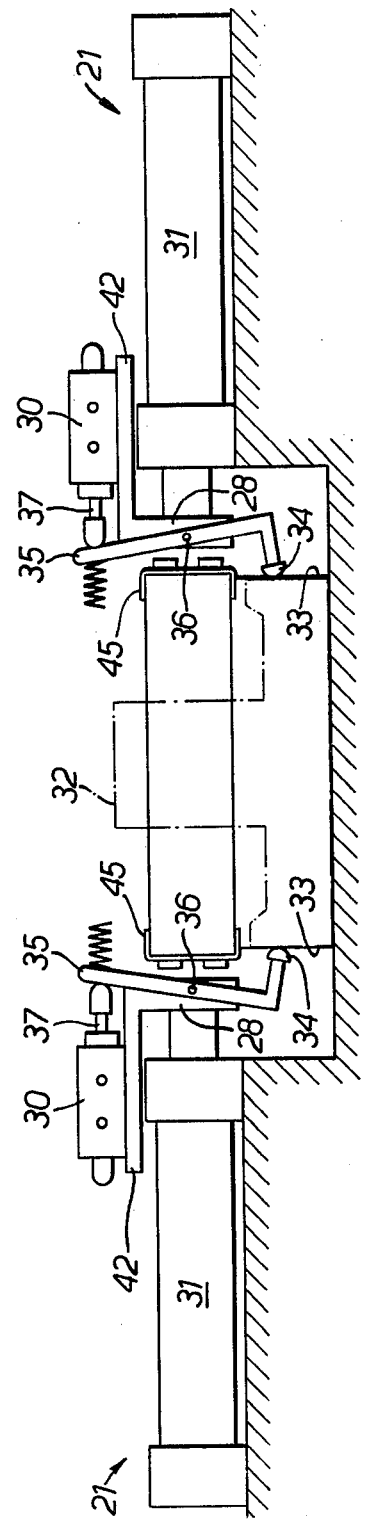

APPARATUS FOR LADDER CONSTRUCTIONS

This is a divisional application of Ser. No. 136,767, filed Apr. 3, 1980.

This invention relates to improvements to step ladders.

The object of the present invention is to provide a step ladder construction in which the steps may be swage connected to the stiles. In conventional step ladders, the fixing of the step to the stiles is usually achieved by mechanical fixings such as by rivets or screws. The cost and time taken to make such mechanical joints is relatively high and the present invention aims to dispense with the use of separate mechanical fixing means for making each step to stile joint. Other objects and advantages of the invention will hereinafter become apparent.

With the foregoing and other objects in view, this invention in one aspect resides broadly in a step to stile connection for a ladder, comprising a step having an integral hollow section extending therealong and passing through, at each end thereof, a correspondingly shaped aperture in the respective said stile so as to protrude therebeyond and the protruding portion of said hollow section being swaged about said stile.

FIG. 5 illustrates a further embodiment of the invention;

FIG. 7 illustrates the operative arrangement of the hydraulic operating rams.

Figure 1:
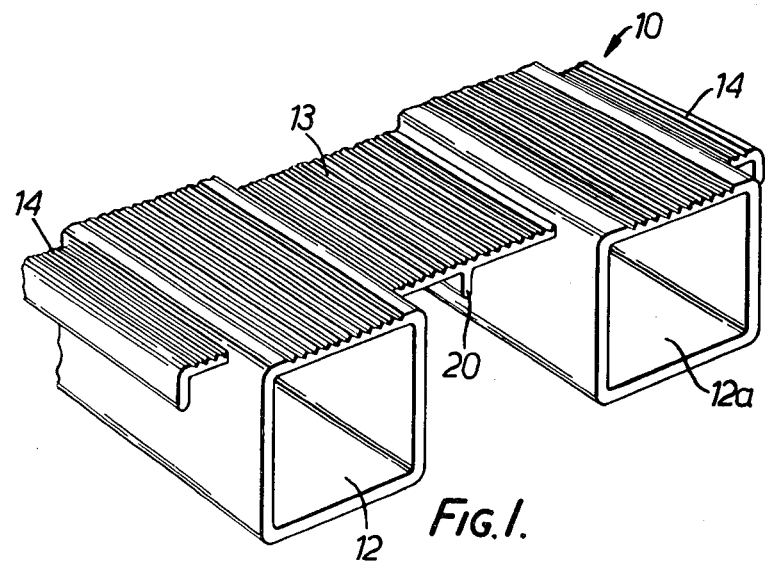
FIG. 1 is a perspective view of an end portion of an extruded aluminium ladder step.
Figure 2:
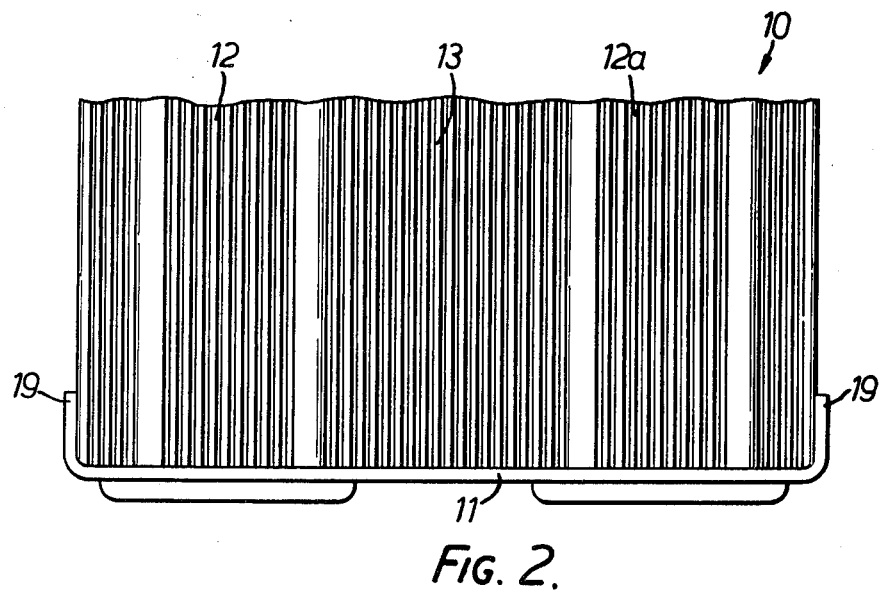
FIG. 2 is a broken-away plan view illustrating the step to stile swage connection of the present invention.
Figure 3:
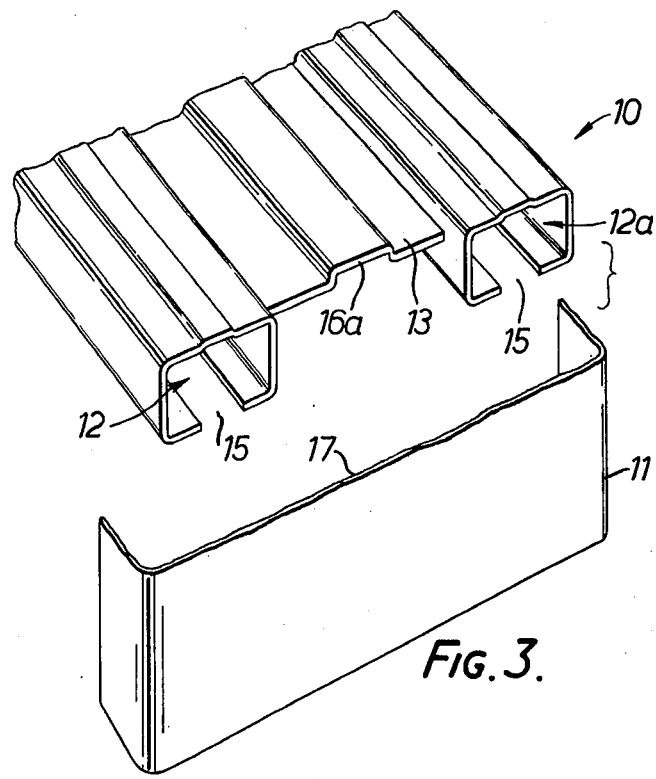
FIG. 3 is a perspective view of one end portion of a ladder step adapted for swaged connection to a channel-shaped stile.
Figure 4:
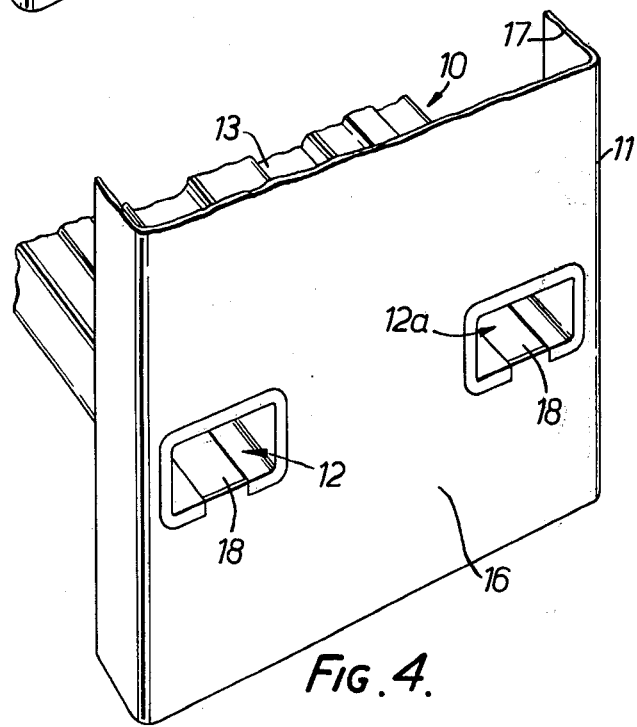
FIG. 4 is a perspective view illustrating the swage joint formed according to the present invention between the step and the stile.

In the embodiment illustrated in FIG. 1 and FIG. 2, the step extrusion is formed with a pair of hollow sections whereas the embodiment shown in FIG. 3 and FIG. 4 illustrates the step extrusion formed with a pair of open sections. However, the parts are equivalent and will be given like numerals throughout the specification. As shown in FIG. 1 and FIG. 2, each step 10 of a ladder (not shown but comprising a plurality of spaced apart steps supported between stiles), is connected at its opposite ends to the respective oppositely arranged channel-shaped stiles 11 (only one of which is shown) by means of a swage connection as shown in plan in FIG. 2. For this purpose, the step 10 is formed as an aluminium extrusion having a pair of hollow sections 12 and 12a extending therealong adjacent the respective opposite sides of the step 10, an intermediate web portion 13 extending between the hollow sections 12 and outer side projections 14. In use, these portions 14 and the intermediate portion 18 are cut back to form shoulders from which the hollow sections 12 and 12a protrude in order that they may extend through the respective stile, whereby they may be connected thereto by a swaging operation, and for this purpose, the radii of the corners of the hollow sections are sufficiently large to enable the end portion of the protruding sections 12 and 12a to be folded about the web of the stile to form the swage connection.

The preferred form of ladder as shown, includes a pair of hollow sections 12 and 12a extending longitudinally adjacent each edge which is defined by outward projections 14 adapted to fit neatly within the return portions 19 of the channel-shaped stile 11. These edge projections 14 act as locating guides for blanking and maintain the respective hollow sections inwardly from the respective edges of the stiles. Additionally, they ensure that the outermost portion of the swage joint does not extend beyond the side faces of the stile 11. Additionally, the intermediate portion 13 is preferably stepped downwardly beneath the level of the hollow box sections 12 and 12a and it is preferred that there be provided a central longitudinally extending ridge portion 20 to stiffen this section. Alternatively, the centre section between the hollow sections 12 and 12a which form the swage connections could be formed as a central hollow section. Also, the stiles may be made of sections other than channel sections, such as hollow box sections, and if desired, the stiles may be pre-punched.

As shown in FIG. 3 and FIG. 4 the step 10 of this embodiment has an intermediate web portion 13 extending between open hollow portions 12 and 12a which, as shown are slotted along their underside at 15. As in the previous embodiment, the central web portion 13 interconnecting the open sections 12 and 12a is, prior to connection to the stile, cut away from the ends of the open sections 12 so that in the finished joint the outer end 16a of the web portion 13 may abut against the inner surface 17 of the stile 11 whereas the end portion of the open sections 12 may project through the stiles 16 to be swaged thereabout to secure the rung to the stile.

As per the previous embodiment, the steps may be provided with outer side projections "14", however it is preferred that there be provided a lower projection as well as a top projection at each side so as to stabilize the stile to step joint about the lower edge of the step, the lower projection forming an abutment to prevent the stile moving inwards along the bottom edge of the step. Furthermore, as illustrated in FIG. 5, an insert 9 suitably of die cast material of a hardness higher than the step may be inserted into the hollow sections 12 and 12a after the tread is blanked and assembled to ladder stile. The die cast inserts 9 are fed automatically into pins and then pressed into tread configuration to swage over end of treads to stile and as a permanent fixture they make a stronger connection.

Preferably, the connecting operation is formed between the rung, shaped as aforesaid, and the plain channel shaped stile. The stile is suitably formed from a material which is of equivalent hardness to the step extrusion, the cross-sectional area of the latter being strong enough whereby the apertures 18 in the stiles 11, for through-passage of the respective hollow box sections, are punched by forcing the protruding ends of the step 10 into engagement with the inner face of the stile which is supported by a co-operating blanking die conforming with the open section 12 so as to force the step ends through the stile, causing rectangular holes to be punched through the stile to permit the rung ends to pass therethrough.

After this operation, the blanking dies are removed and swaging dies are operatively positioned in their place so as to engage against the end of the hollow section 12 protruding through the stile and swage them about the outer face of the stile 16. This operation is preferably carried out automatically whereby the respective dies are supported on the clamping frame so that either may be moved into the operative position. In order to prevent the corner portions of the swaged flanges splitting, it is preferred that the swaging tool be provided with lead-in portions adapted to turn over the corner portions of the open sections prior to the intermediate straight portions therebetween to relieve stress on the flanges during the swaging operation.

In one embodiment, all the joints between the steps 10 and the respective opposite stiles 11 are formed in one operation, and for this purpose, the steps 10 are supported on a jig assembly in their operative relationship and clamping means are provided to support the stiles and move same inwards into engagement with the respective ends of the hollow sections. Preferably, the clamping means also carried interchangeable blanking and swaging dies for respective simultaneous co-operation with each respective end of each rung. The blanking die is disposed in its operative position during initial clamping operations and the oppositely arranged dies are forced inwards to cause the steps to blank out the stiles. Thereafter, the blanking dies are moved to their inoperative position and the swaging dies are moved into alignment with the step ends. The swaging dies are operated simultaneously to bear against the opposite projecting ends of the respective rung and to apply sufficient pressure, not greater than 3000 KPa, to swage-connect the projecting ends about the stiles.

It will be appreciated that the joint formed in accordance with the present invention is very secure, particularly since the blanking operations performed by the actual rung, which forms an undersize aperture through which the rung is forced and the surrounding metal of the stile is, in the process, stretched outwardly but remains in firm contact with the rung to prevent retraction of the rung through the stile. This clamping action is an over-centre type action so that the greater the force tending to cause retraction of the rung through the stile, the greater is the clamping effect of the surrounding metal in the stile about the projecting rung portions.

Preferably, the swage connections between the ends of each step 10 and the stiles 11 are formed simultaneously and for this purpose, the steps and stiles are adapted to be operatively disposed for indexed advancement through swaging apparatus whereby the swage connections at successive steps are made. However, is disposed in its operative position during initial clamping operations and the oppositely arranged dies are forced inwards to cause the steps to blank out the stiles. Thereafter, the blanking dies are moved to their inoperative position and the swaging dies are moved into alignment with the step ends. The swaging dies are operated simultaneously to bear against the opposite projecting ends of the respective rung and to apply sufficient pressure to swage-connect the projecting ends about the stiles.

It will be appreciated that the joint formed in accordance with the present invention is very secure, particularly since the blanking operations performed by the actual ring, which forms an undersize aperture through which the rung is forced and the surrounding metal of the stile is, in the process, stretched outwardly but remains in firm contact with the rung to prevent retraction of the rung through the stile. This clamping action is an over-centre type action so that the greater the force tending to cause retraction of the rung through the stile, the greater is the clamping effect of the surrounding metal in the stile about the projecting rung portions.

Preferably, the swage connections between the ends of each step 10 and the stiles 11 are formed simultaneously and for this purpose, the steps and stiles are adapted to be operatively disposed for indexed advancement through swaging apparatus whereby the swage connections at successive steps are made. However, unlike conventional ladders, the stiles of step ladders converge towards their upper end, and thus, the ends of the rungs 10 have to be cut parallel to the stiles and the respective oppositely arranged swage head assemblies have to be set at an angle to the rungs to form the swage connection. Preferably, the back stop or cam members of the swaging apparatus are indexed for advancement past the swaging heads together with the frame which supports the ladder components for indexed movement past the blanking and swaging head assemblies. During this operation, the distance between the respective stiles and their co-operating cam members is maintained constant so that the stroke of the rams is maintained constant irrespective of the distance between the opposite stiles. Thus, apparatus for assembling such frames may be relatively compact and the stroke of the swaging head assembly may be maintained desirably short. Such apparatus is illustrated diagrammatically in FIG. 6 and FIG. 7.

Figure 6:
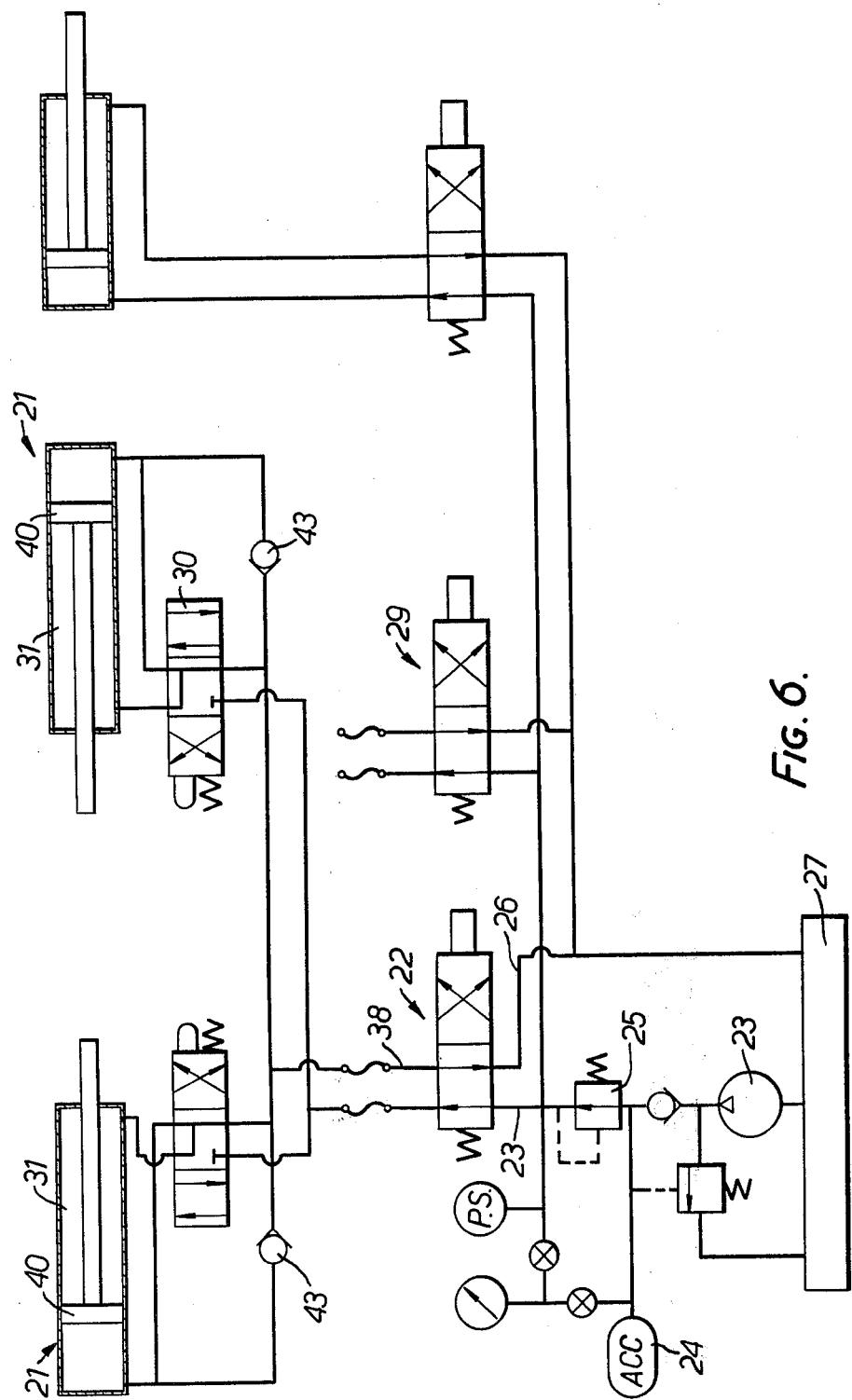
FIG. 6 is a schematic view illustrating the hydraulic circuit arrangement of a preferred embodiment.

As shown in FIG. 6 and FIG. 7, each of two pairs of operating rams 21 is connected in parallel with a respective manual control valve 22 or 29 having an inlet 23 communicating with the high pressure supply which in this embodiment includes a pump 23, an accumulator 24 and a pressure regulating valve 25 and additionally the control valve 22 is connected at 26 to the reservoir 27. One pair of hydraulic rams 21 is provided with operating heads 28 in the form of blanking dies while the operating heads 28 of the other pair of hydraulic rams are provided with swaging dies. One pair of hydraulic rams is provided with blanking heads while the other pair of rams is provided with swaging heads. As the ladder is advanced past the first pair of heads the blanking operation is carried out, whereafter the blanked joint is advanced to the next pair of rams which swage the protruding ends about the stiles. As shown, one pair of rams is actuated by the solenoid control valve 22 while the other pair of hydraulic rams, not shown, is operated by the solenoid control valve 29, the hydraulic connections between the control valve 29 and the second pair of hydraulic rams being identical to the arrangement for the valve 22.

As shown, each hydraulic ram 21 is connected into the hydraulic circuit through a servo valve 30 which is adapted to operatively position the operating heads 28 in selected spaced relationship to the respective joints between the styles 11 and steps 13 as shown, while the ram bodies 31 remain fixed in relation to the main frame 44 of the apparatus.

It will be appreciated that step ladders, in general, are wider at the base than at the top, and thus as the ladder advances stepwise through the swaging apparatus is fixed increments equal to the distance between the respective steps, the operational position of the operating heads 28 has to be varied to maintain the selected clearance. In this respect, the supporting jig 32 which supports the ladder components for advancement past the pairs of ram assemblies is provided with elongate cam faces 33 which lie parallel to the styles 45. The cam faces 33 are each adapted to be contacted by the gauging ends 34 of respective control levers 35, fixed pivotally at 36 to the respective ram end bodies 42 adjacent the operating heads 28 and extending therepast to abut against the actuator 37 of each servo valve 30 which is mounted fixedly on rearward extensions 42 of the operating heads 28.

In use, when the control valve 22 is actuated so as to pressurise the line 38, hydraulic fluid is supplied to the back of the respective pistons 40 through the check valve 43, so that the respective blanking or swaging operating can be affected, whereafter the control valve is released to return to its normal position. As the ladder components are then advanced on the jig 32 to the next style, the gauging heads 34 will be moved outwardly by the splayed cam faces 33, so that the actuator 37 will be moved inwardly to by-pass fluid to the front of the piston 40 through the line 41 which will retract the operating heads 28 as the rear of the piston is then placed in communication with the drain line 38. This, in turn will cause the actuators 37 to move outwardly so as to place the servo valve in its neutral position, as illustrated, awaiting the next actuation of the control valve 22. Thus, it will be seen that the hydraulic rams are adjusted after each operation to place the operating heads adjacent the ladder frame to be assembled at which position they may be quickly moved into engagement with the ladder frames to perform the selected operation. This will enable the cycle of operations to be greatly reduced.

Of course, other suitable means could be employed to move the swaging head assemblies in the transverse direction to maintain an operative relationship with the respective ends of the step ends to be swaged, and for example, the relatively movable swaging head assembly may be supported for movement as a unit in the transverse direction for movement to an operative position adjacent the step end to be swaged.

It will be seen that a step ladder constructed according to the present invention will be extremely strong and the steps will be positively retained in the stiles in a manner which will prevent flexing of the steps between the stiles. This will produce a step ladder which is torsionally stiff and rugged. The joint of this invention may be applied also to extension ladders and the like and reference herein to a step ladder is a reference to all ladder rung types. Additionally, hollow section stiles may be used in lieu of the channel shaped stile hereinbefore referred to.

Of course, it will be realised that while the above has been given by way of illustrative example, many modifications of constructional detail and design may be made to the above described embodiment by persons skilled in the art without departing from the broad scope and ambit of the invention as is defined in the appended claims.

I claim:

1. Apparatus for forming a ladder of ladder components comprising a pair of stiles and a plurality of steps, said steps being formed with at least one hollow section at each end, comprising a carriage assembly adapted to support and to advance the operatively positioned ladder components longitudinally along a path in a stepwise fashion, two longitudinally spaced pairs of opposed hydraulic rams, the rams of each said pair being disposed at opposite sides of said positioned ladder components supported on said carriage, each said ram being provided with operating heads, one said pair of operating heads being provided with blanking dies to force said hollow end sections of said steps through the respective said stiles to protrude therefrom and the other said pair of operating heads being provided with swaging dies to swage the protruding hollow end sections about the respective said stiles.

2. Apparatus according to claim 1, wherein said pairs of hydraulic rams are longitudinally spaced apart a distance equal to the distance between the ladder steps whereby as said ladder components are advanced stepwise, the opposite ends of each step are successively operatively positioned in alignment with said blanking dies and said swaging dies.

3. Apparatus according to claims 1 or 2, wherein said hydraulic rams are double acting and wherein each is adapted to be operatively located with respect to the respective said stile by means of a servo control valve provided with sensing means responsive to the proximity of the respective stile and adapted to maintain said operating heads at a pre-determined distance from the respective said stile.

4. Apparatus according to claim 3, wherein said sensing means comprises a contact member adapted to extend operatively between the servo valve control and a cam surface on said carriage assembly disposed in register with the outer face of the respective stile.

5. Apparatus according to claim 3 or claim 4, wherein said servo valve is a three position valve having a first position in which fluid can drain from said ram to enable the respective said ram to retract, a second position in which fluid may be supplied to advance said ram and a neutral position in which fluid flow through valve is prevented and in which position fluid may be by-passed to said ram through a check valve.

* * * * *